US010546156B2

(12) United States Patent
Poornachandran et al.

(10) Patent No.: US 10,546,156 B2
(45) Date of Patent: Jan. 28, 2020

(54) MRC TRAINING IN FPGA-IN-MEMORY-CONTROLLER

(71) Applicant: INTEL CORPORATION, Santa Clara, CA (US)

(72) Inventors: Rajesh Poornachandran, Portland, OR (US); Vincent Zimmer, Federal Way, WA (US); Ned Smith, Beaverton, OR (US); Nadhiya Chandramohan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 190 days.

(21) Appl. No.: 15/410,123

(22) Filed: Jan. 19, 2017

(65) Prior Publication Data

US 2018/0203629 A1    Jul. 19, 2018

(51) Int. Cl.
*G06F 3/06* (2006.01)
*G06F 21/76* (2013.01)

(52) U.S. Cl.
CPC .................................. *G06F 21/76* (2013.01)

(58) Field of Classification Search
CPC ........ G06F 3/0629; G06F 3/061; G06F 3/067; G06F 21/56; G06F 3/06; G06N 99/005
See application file for complete search history.

(56) References Cited

U.S. PATENT DOCUMENTS

| 10,073,878 B1* | 9/2018 | Han ........................ G06F 3/067 |
| 2009/0119498 A1 | 5/2009 | Narayanan |
| 2009/0265756 A1* | 10/2009 | Zhang ..................... G06F 21/53 726/1 |
| 2011/0154006 A1 | 6/2011 | Natu et al. |
| 2012/0023318 A1 | 1/2012 | Xing et al. |
| 2014/0013095 A1 | 1/2014 | Zimmer et al. |
| 2015/0095633 A1 | 4/2015 | Yao et al. |
| 2016/0077966 A1* | 3/2016 | Stabrawa .............. G06F 3/0604 711/172 |
| 2017/0034193 A1* | 2/2017 | Schulman ........... H04L 63/1416 |
| 2019/0019107 A1* | 1/2019 | Kachare ................ G06F 3/0631 |

OTHER PUBLICATIONS

PCT/US2017/062684, International Search Report and Written Opinion, dated Mar. 28, 2018, 15 pages.

* cited by examiner

*Primary Examiner* — Lynn D Feild
*Assistant Examiner* — Jessica J South
(74) *Attorney, Agent, or Firm* — Stoel Rives LLP (57) ABSTRACT

MRC training can include providing a hot add notification to a UEFI BIOS FW, receiving, at an MRC agent of the FIMC and from the UEFI BIOS FW, the MRC training request, and performing, at the MRC agent in response to the MRC training request, an MRC training independent of an SMM associated with the apparatus.

22 Claims, 8 Drawing Sheets

MRC TRAINING IN FPGA-IN-MEMORY-CONTROLLER

TECHNICAL FIELD

The present disclosure relates to memory reference code (MRC) training in field programmable gate array (FPGA)-in-memory-controller (FIMC). In particular, the present disclosure relates to MRC training independent of a system management mode (SMM).

DETAILED DESCRIPTION OF PREFERRED EMBODIMENTS

Apparatuses, methods, and storage medium associated with MRC training are disclosed herein. In embodiments, an apparatus for computing may include one or more processors, with each processor having one or more processor cores; one or more wireless communication components; memory coupled with the one or more processors and/or the memory controller; and a memory controller to perform MRC training and comprising memory to host an MRC agent. As used herein, MRC training can include selecting memory settings, frequencies, timing, driving, and/or detailed operations of a memory controller. MRC training can be performed to configure physical memory manipulation.

In some embodiments, memory flows (e.g., MRC training) from original equipment manufacturer (OEM) basic input/output system (BIOS) system management mode (SMM) can be implemented in FPGAs. Implementing memory flows in FPGAs can provide a reduced security risk over implementing memory flows in SMM. The SMM and/or C code can have a greater number of security flaws than FPGAs as FPGAs can have a greater potential of validation rigor as a hardware flow.

Host processors, such as the SMM, can be used for physical memory manipulation. Physical memory manipulation can include hot plugging and error management, among others. SMM code, used for the SMM, stored in dynamic random-access memory (DRAM) may be liable to Heisenbugs. SMM code may have security flaws where the memory backing the system management random access memory (SMRAM) management code has flaws. As such, MRC training can be performed in FIMC.

Also, for purposes of field survivability, the ability for an agent, outside the operating system (OS) and/or host firmware, to reprogram memory controller settings can be beneficial. The memory controller can be reprogrammed by doubling the refresh rate to mitigate exposure to rowhammer, in which repeatedly accessing a row of memory in certain DRAM devices can cause bit flips in adjacent rows. Memory hot add is a feature on a computing system. Hot add can be supported using unified extensible firmware interface (UEFI) BIOS MRC training in SMM. MRC training can be implemented to configure the memory controller, allowing the OS to use the newly added memory module dynamically.

UEFI BIOS MRC training may introduce a few challenges. For example, an MRC code applet may time-share/perform central processing unit (CPU) cycle sealing to perform runtime MRC training in conjunction with a current active workload being handled by the OS and/or the CPU. Given typical restrictions imposed by OS's SMM, the UEFI BIOS MRC training may execute no longer than a few milliseconds at a time, at best. This limitation can result in the implementation of complex state machines in conjunction with periodic system management interrupts (SMIs) to complete the MRC training. The high availability of servers for critical functionality can be impacted and the MRC training can be slowed when implementing MRC training in UEFI BIOS SMM.

Additionally, there have been proven attacks on vulnerable UEFI BIOS SMM applets that compromise the virtual machines (VMs)/host OS. The proven attacks can include attacks such as the rowhammer attack that exploits the ability to induce bit flips in adjacent rows to gain kernel privileges and/or gain unauthorized read-write access to all of physical memory.

The embodiments described herein implement MRC training outside of the UEFI BIOS SMM. An FIMC agent (e.g., MRC agent) can be utilized to perform MRC training independent of a host OS, virtual machine monitor (VMM), and/or a UEFI BIOS SMM for better efficiency and robustness.

Some embodiments can include detecting, by a UEFI BIOS firmware (FW) a hardware event such as a memory hot plug event. The embodiments described herein are provided in terms of memory hot plug events. However, the embodiments can also be applied to redundant failover events, fault tolerant redundancy events, audit/log management events, fault detection events, fault reporting events, autonomous recovery events, security attack (e.g., rowhammer) events, side-channel attack events, environmental attacks (heating/cooling/vibration) events, and/or attack events that induce recovery code execution, among other types of events. The UEFI BIOS FW can notify a FIMC driver via an advanced configuration and power interface (ACPI) of the memory hot plug event. The FIMC driver can request MRC training from an MRC agent implemented in an FPGA. The FPGA implementing the MRC agent can be hosted in one of a number of locations. For example, the FPGA can be located in a CPU, graphical processing unit (GPU), and/or a memory controller, among other locations of a system. In some examples, the FPGA can be coupled to system memory through a bus interface.

The MRC agent can execute MRC code to perform the MRC training. The MRC agent can alert a host driver (e.g., FIMC driver) of the completion of the MRC training. The MRC agent can alert (e.g., notify) the host driver of the completion of the MRC training using an interrupt that can be processed by the FIMC driver. The FIMC driver can then query the MRC agent for additional information if needed. The additional information can include whether the MRC training was successfully completed or if the MRC training terminated in a failure. The additional information can also include diagnostic information, among other types of information.

Following a successful MRC training and verification with the FIMC driver, the FIMC driver can invoke the UEFI BIOS FW using an ACPI method or an equivalent mechanism to complete various other implementation specific operations. The implementation specific operations can include updating a memory map, for example. The implementation specific operation can be specific to the hardware event, such as specific to the hot plug event.

In some embodiments, the MRC agent can handle a hot plug event and the MRC training locally by excluding the use of insecure UEFI BIOS SMM modes for hot plug detection prior to performing MRC training. That is, the UEFI BIOS SMM modes can be excluded from handling hot plug events prior to MRC training being performed. The MRC agent can run MRC code from SRAM internal to the FPGA and/or the FIMC instead of utilizing sequestered DRAM to mitigate cases where rowhammer is flipping bits. Rowhammer is an example of a tampering attack that can be detected as a deviation from the norm if there is already a machine learned characterization of a arowhammer attack. The FIMC might also have the attack signature loaded where the anomalistic pattern is compared to the rowhammer pattern for attack classification. This could occur on-chip or off-chip. On-chip classification has the benefit of being able to dynamically respond to the attack in a timely fashion to, hopefully, prevent loss of data or other compromise.

The embodiments described herein can reduce the dependency on SMM code to integrate hot plug memory to a system device and thus reduce the attack surface for SMM vulnerabilities. The embodiments can be OS scheduler friendly and can be implemented using an FIMC independent of host processor (e.g., converged security engine (CSE)). Although the examples described herein characterize the FIMC as FPGA, the FIMC can also be implemented as ASIC or a hybrid of FPGA and ASIC. For example, in FIG. 1, the FIMC can be implemented as an FPGA while the TEE is implemented as an ASIC. The embodiments are scalable to hypervisor or OS model. That is, although the embodiments may describe hardware and/or software the embodiments can be implemented in a hypervisor such that a software emulation of hardware can be used to implement the embodiments described herein. MRC agents can be field updated for any potential exploits independent of host OS/UEFI BIOS updates by a remote administrator via a secure out of band (OOB) channel. A cloud administrator can leverage crowd-sourced FIMC MRC agent analytics data to fine-tune data center deployments.

Leveraging crowd-sourced FIMC MRC analytics data can include utilizing machine learning. The crowd-sourced FIMC MRC analytics data can constantly changing whether active training is occurring or not. Machine learning can be utilized to develop attack profiles or collect and refine operational data. The MRC agent can utilize DRAM and/or flash memory to perform MRC training. FPGAs can be configured as storage whereas ASICs must integrate separate storage resources.

In some embodiments guarantees can be made on C code. In some embodiments, a cloud administrator can correlate the data center workload distribution with the crowd-sourced MRC agent analytics data to calibrate MRC registry transfer level (RTL) (e.g., code used to program the FPGAs) dynamically to meet required performance per watt which can lead to a faster refresh cycles.

Guaranteeing C code can refer applying correctness proofs to code. Correctness proof is a static analysis discipline that is costly and doesn't scale to large bodies of code. An advantage of a FPGA approach is that logic used to configure the FPGA can be tested to be provably correct. Later, after the proofs have been validated, the validated code can be programmed on the FPGA increasing the security. Although a number of embodiments are provided in terms of "C" code, any type of code and/or code language can be utilized.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed to imply that these operations are necessarily order dependent. In particular, these operations may not be performed in the order of presentation. Operations described may be performed in an order different from that of the described embodiment. Various additional operations may be performed and/or described. Operations may be omitted in additional embodiments.

For the purposes of the present disclosure, the phrase "A and/or B" means A, B, or A and B. For the purposes of the present disclosure, the phrase "A, B, and/or C" means A, B, C, A and B, A and C, B and C, or A, B, and C.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
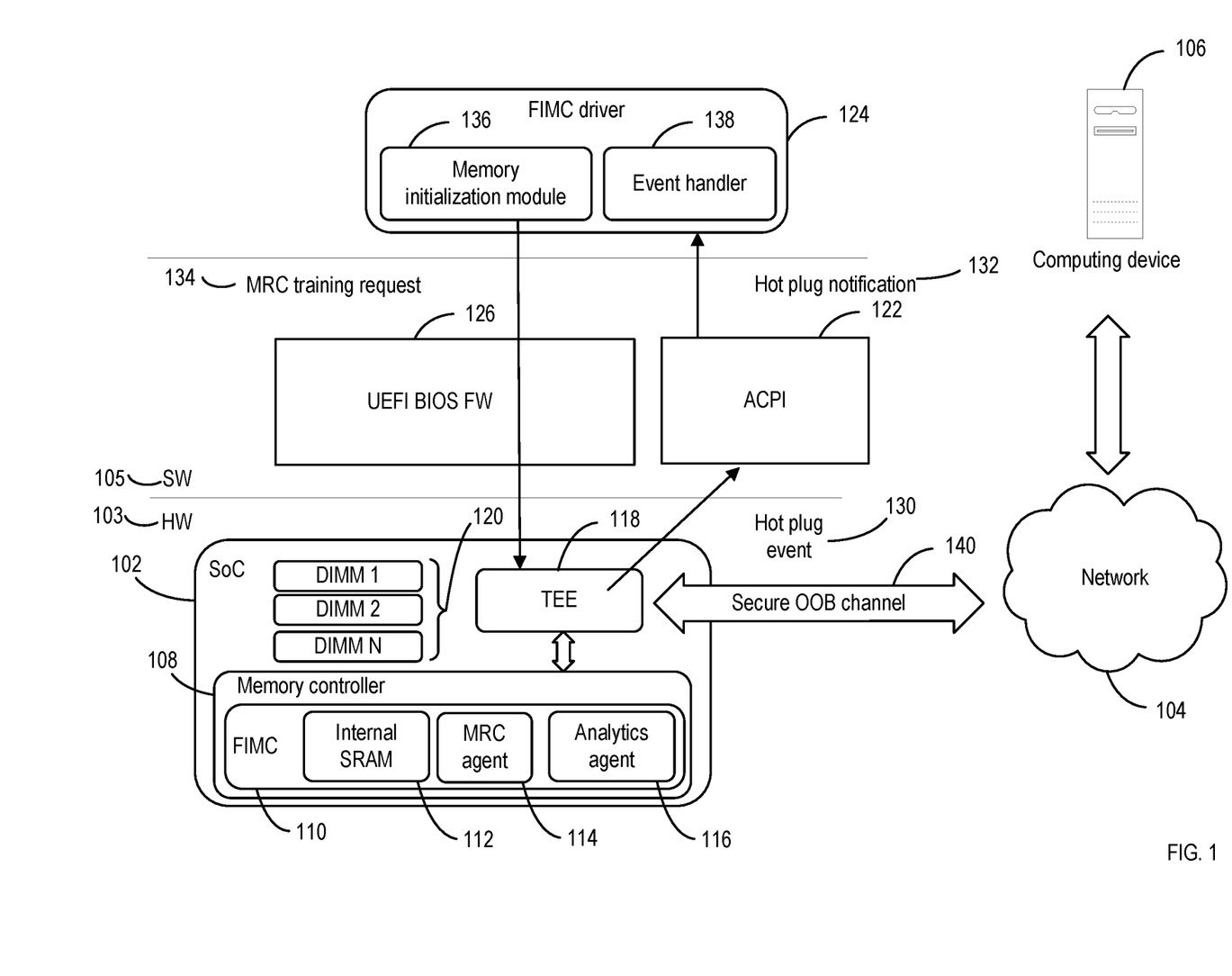
FIG. 1 is a block diagram illustrating a computing device having a FIMC according to various embodiments.

FIG. 1 is a block diagram illustrating a computing device having a FIMC according to various embodiments. FIG. 1 includes a system on chip (SoC) device 102, a network 104, and a computing device 106.

The computing device 106 can be a removable computing device that is operated by an administrator of the SoC device 102. The computing device 106 can be operated by an information technology (IT) specialist, for example, to administer over the SoC device 102. The network can couple the computing device 106 to the SoC device 102 utilizing a secure OOB channel 140. The SoC device 102 can be composed of hardware (HW) 103 and software (SW) 105.

The HW 103 can comprise memory 120 (e.g., dual in-line memory module (DIMM) 1, DIMM 2, . . . DIMM N). The memory 120 can also be referenced as system memory. The HW 103 can also comprise a memory controller 108 and a trusted execution environment (TEE) 118, among other HW components such as one or more processing units.

The memory controller 108 can comprise a FIMC 110, among other hardware elements. The FIMC 110 can include internal SRAM 112 (e.g., internal memory), an MRC agent 114, and an analytics agent 116.

The memory controller 108 can be coupled to the TEE 118 via a communication interface. The TEE 118 can communicate with the computing device 106 via the secure OOB channel 140 and the network 104, as previously referenced.

Although the HW 103 is illustrated in FIG. 1, it is to be understood that the example provided herein is illustrative and not limiting. As such, other HW components can be integrated in the SoC device 102 without deviating from the scope of the embodiments described herein.

Although the memory controller 108, the FIMC 110, the internal SRAM 112, the MRC agent 114, and the analytics agent 116 are marked as HW 103, the memory controller 108, the FIMC 110, the internal SRAM 112, the MRC agent 114, and/or the analytics agent 116 may comprise software components and as such should not be limited in scope to only hardware but can include software components needed for the utilization of the HW 103. For example, the MRC agent 114 may operate utilizing MRC code (not shown) that is stored in the internal SRAM 112. As such, a reference to the MRC agent 114 can also include a reference to the MRC code used to operate the MRC agent 114.

The SW 105 can include software that is executed on the HW 103. The SW 105 can include an ACPI 122, an FIMC driver 124, and a UEFI BIOS FW 126. The FIMC driver 124 can include a memory initialization module 136 and an event handler 138, among other modules and/or software components.

The FIMC 110 is a hardware block comprised of a FPGA and/or an ASIC. The FIMC driver 124 is a kernel mode driver running at the host operating system/VMM. The FIMC driver 124 include the mechanism and/or software to talk to FIMC 110. A host platform operating system and/or VMM may not know specific hardware details. The FIMC 110 can interface for the OS and/or VMM to allow the OS and/or VMM to talk to the FIMC 110.

The ACPI 122 and the FIMC driver 124 are different SW entities. The ACPI 122 is a SW mechanism used to notify registered drivers such as the FIMC driver 124 of hardware events.

FIG. 1 also shoes a hot plug event 130, a hot plug notification 132, and an MRC training request 134. The hot plug event 130, the hot plug notification 132, and the MRC training request 134 can be messages, interrupts, and/or other forms of communications between hardware components, between software components, and/or between hardware and software components.

The FIMC 110 is a hardware component integrated in the memory controller 108 using an FPGA. The FIMC 110 can interact with the TEE 118 (e.g., platform TEE) in a secure out-of-band manner. Interactions local to the memory controller 108 may be considered 'trusted' because they are local to the secured environment of the memory controller. The DIMMs 120 and/or the network 104 may be located off-chip and may require some form of protection. The secure OOB channel 140 can also be references as a management channel, a control channel, and/or a debug interface.

The MRC agent 114 comprises RTL software/firmware components introduced in a number of examples that can perform secure MRC training using the internal SRAM 112 within the FIMC 110. The analytics agent 116 comprises RTL introduced in a number of examples that can perform MRC training analytics using the internal SRAM 112 within the FIMC 110.

The computing device 106 can be part of a cloud network. That is, the computing device 106 can be a remote cloud management administration system that can provision RTL bit streams (e.g., code such as MRC code and/or analytics code) to manage the modules (e.g., the MRC agent 114 and/or the analytics agent 116) within the FIMC 110 dynamically and securely via the TEE 118 and the secure OOB channel 140. The computing device 106 can also aggregate alerts and/or MRC analytics from a variety of reliability availability serviceability (RAS) systems running the MRC agent 114 and/or the analytics agent 116 via the secure OOB channel 140. The computing device 106 can also performs mitigation patch deployment via the secure OOB channel 140 independent of the SoC device 102. RAS systems may refer to a management console configured to ensure the correct operation of a component.

As previously described, the hot plug event 130 can describe the hot plugging of memory to the SoC device 102. The hot plug event 130 can be generated by the TEE 118 as shown in FIG. 1. The hot plug event 130 can also be generated by the UEFI BIOS FW 126 as previously described. The ACPI 122 can receive the hot plug event 130. The ACPI 122 can generate the hot plug notification 132 and provide the hot plug notification 132 to the FIMC driver 124. The FIMC driver 124 can receive the hot plug notification 132 at the event handler 138. The FIMC driver 124 can initialize the memory based on receiving the hot plug notification 132. The FIMC driver 124 can activate the memory initialization module 136 to initialize the memory (e.g., hot plug memory added to the SoC device 102). The memory initialization module 136 can generate an MRC training request 134 and provide the MRC training request 134 to the TEE 118.

The TEE 118 can provide the MRC training request 134 to the memory controller 108 by providing the MRC training request 134 to the MRC agent 114. The MRC agent 114 can execute MRC code stored in the internal SRAM 112 to initialize the memory added to the SoC device 102. The analytics agent 116 can analyze the function of the MRC agent 114 to generate analytical data that can be provided to the computing device 106. The computing device 106 can update the analytics agent 116 and/or the MRC agent 114 by updating the MRC code and/or the analytics code which are used to drive the function of the MRC agent 114 and the analytics agent 116, respectively.

Figure 2:
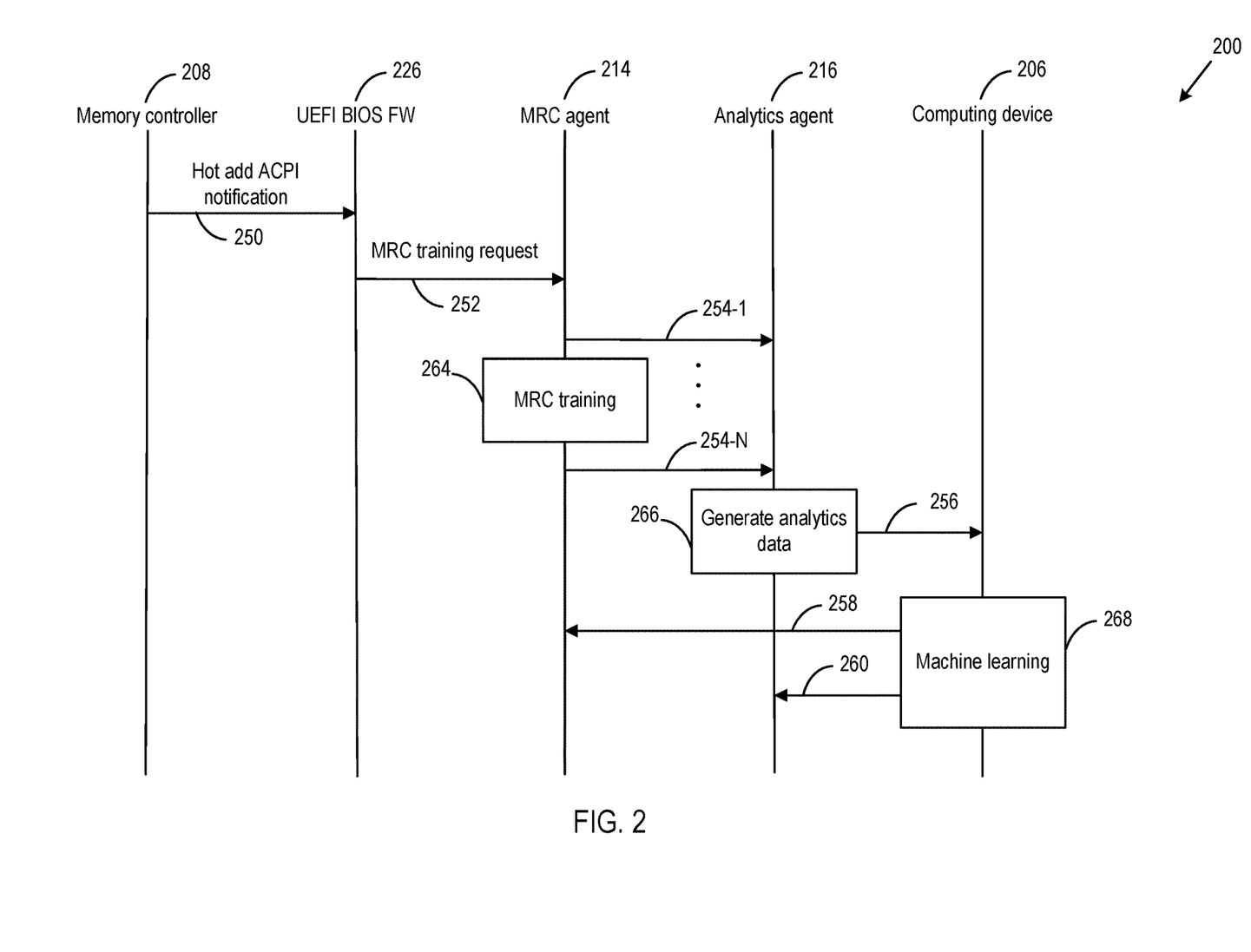
FIG. 2 is a timing diagram illustrating MRC training according to various embodiments.

FIG. 2 is a timing diagram 200 illustrating MRC training according to various embodiments. The timing diagram 200 describes the timing of messages (e.g., a hot add ACPI notification 250, an MRC training request 252, MRC messages 254-1 to 254-N, an analytics message 256, and administrative messages 258 and 260) and a plurality of processes (e.g., MRC training 264, generate analytics data 266, and machine learning 268). The timing diagram 200 also shows a memory controller 208, a UEFI BIOS FW 226, an MRC agent 214, an analytics agent 216, and a computing device 206. The MRC messages 254-1 to 254-N are referred to generally as MRC messages 254.

The memory controller 208 can generate and provide the hot add ACPI notification 250 to the UEFI BIOS FW 226. Upon receiving the hot add ACPI notification 250, the UEFI BIOS FW 226 can generate and provide the MRC training request 252 to the MRC agent 214. The MRC agent 214 can perform MRC training 264 as previously described. In some examples, the MRC agent 214 can perform MRC re-training (e.g., MRC training 264) since the previously trained template can be specific to a configuration involving additional or fewer DIMMs resulting in signatures that are outside the threshold limits of the analytics operations.

In some embodiments, the MRC agent 214 can be in communication with the analytics agent 216. The MRC agent 214 can provide data to the analytics agent 216 which the analytics agent 216 can process to generate 266 analytics data. For example, the MRC agent 214 can inform the analytics agent 216 of the initiation and the conclusion of MRC training 264 via the MRC messages 254. The analytics agent 216 can utilize the start time and the conclusion time to generate a duration of time for the MRC training 264. Analytics agent 216 can also capture additional information such as memory details (e.g., manufacture, capacity, channels, etc.), geographical fence data (e.g., platform location), time, date, agent's version, etc., among other types of additional information. The compute device 206 can leverage the analytics data from one or many crowd-sourced RAS systems to identify any potential vulnerabilities (e.g., row hammer) or any functional improvements (e.g. memory physical training) that can be fixed/improved upon with appropriate updates. This can be tied to a 'pay-as-you-configure' or some form of incentive service model wherein programmers/data center hosts can update the memory operating frequencies for specific targeted workload for monetization. As an example, a tenant using web services can pay a premium to update (e.g., crank up) the memory training so that I/O performance can be improved (for a specified period).

In some examples, the MRC agent 214 can process the data and provide the analytics data to the analytics agent 216. For example, the MRC agent 214 can generate data associated with the MRC training 264 and process the data to generate 266 analytics data. The MRC agent 214 can provide the analytics data after the MRC training 264 has concluded via MRC message 254-N, for example.

The analytics agent 216 can generate 266 the analytics data as previously described. The analytics agent 216 can provide the analytics data to the computing device 206 via the analytics message 256.

Figure 3:
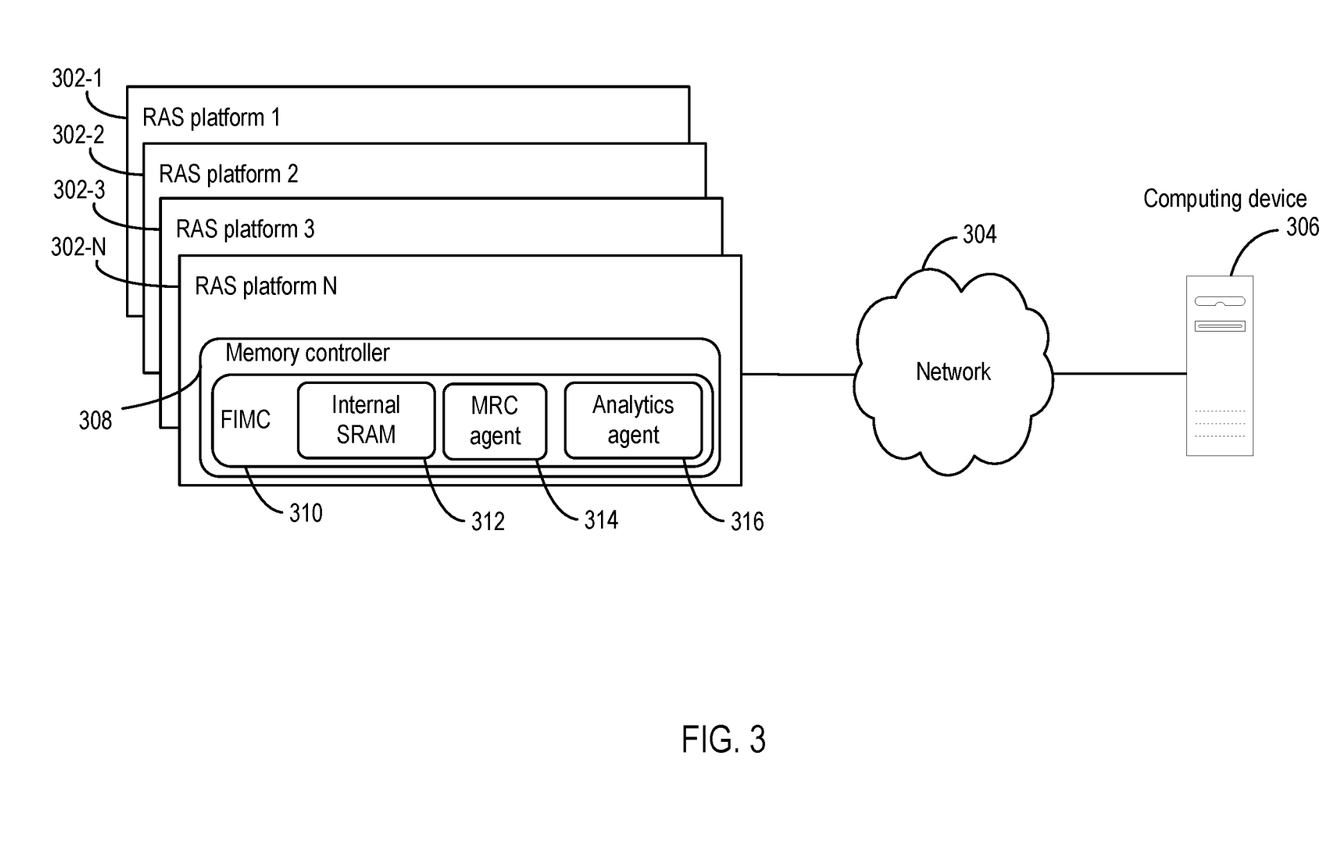
FIG. 3 is a block diagram illustrating a high level system architecture for MRC training a plurality of FIMCs according to various embodiments.

The computing device 206 can receive and process the analytics data. For example, the computing device 206 can perform machine learning 268 on the analytics data to analyze the performance of the MRC agent 214 in performing MRC training 264. The machine learning 268 can be performed on aggregated crowd-sourced data (e.g., analytics data). The computing device 206 can provide dynamic OOB RTL updates based on the result of the machine learning 268, as shown in FIG. 3. The updates can be provided to the memory controller 208 via TEE secure OOB channel 140, the MRC agent 214, and/or the analytics agent 216 via the administrative messages 258 and 260. The MRC code and/or the analytics code can be updated using the updates provided by the computing device 206 to update the MRC agent 214 and/or the analytics agent 216.

FIG. 3 is a block diagram illustrating a high level system architecture for MRC training across a plurality of FIMCs according to various embodiments. FIG. 3 includes RAS platforms (e.g., SoC device) 302-1, 302-2, 302-3, and 302-4 referred to generally as RAS platforms 302. Each of the RAS platforms 302 may include a memory controller 308. The memory controller 308 can comprise a FIMC 310. The FIMC 310 can comprise internal SRAM 312, an MRC agent 314, and an analytics agent 316.

Each of the RAS platforms 302 can communicate with a computing device 306 via a network 304. The computing device 306 can be remote to the RAS platforms 302. Each of the RAS platforms 302 can communicate with the computing device 306 utilizing a different secure OOB channel or a same secure OOB channel. The different secure OOB channels can couple the network 304 to a plurality of TEEs (e.g., TEE 118 in FIG. 1), each TEE being hosted by a different one of the RAS platforms 302.

The computing device 306 can receive analytics data from each of the RAS platforms 302. The analytics data received from the RAS platforms 302 can be referred to as aggregated crowd-sourced data. The computing device 306 performs machine learning using the analytics data received from the RAS platforms 302.

That is, the computing device 306 can aggregate the MRC training analytics data collected from the RAS platforms 302 running the respective MRC agents 314. The analytics data can be received, as previously described, via a TEE secure OOB channel. The computing device 306 can perform exploit mitigation patch deployment via the TEE secure OOB channel independent of the RAS platforms 302. That is, the computing device 306 can update the MRC agent 314 and the analytics agent 316 independently without the assistance of the RAS platforms 302.

The machine learning can be used to generate the aggregate MRC training analytics data. The machine learning can be performed utilizing machine learning inference rules on the crowd source data (e.g., analytics data from the platforms 302) to generate dynamic custom RTL updates for ingredient RAS FIMCs in response to any potential vulnerability/functional efficiencies, and provision the RTL patches securely via the TEE (e.g., TEE secure OOB channel) independent from hosts (e.g., RAS platforms 302).

The computing device 306 can update the MRC agents 314 and/or the analytics agents 316 of the RAS platforms 302 based on the machine learning using the analytics data. The computing device 306 can update a single MRC agent 314 and/or analytics agent 316, multiple MRC agents and/or analytics agents, or all of the MRC agents and/or analytics agents based on the machine learning results. The computing device 306 can provide a single update to all of the RAS platforms 302, some of the RAS platforms, and/or a single RAS platform (e.g., RAS platform 302-1) based on the machine learning results.

Figure 4:
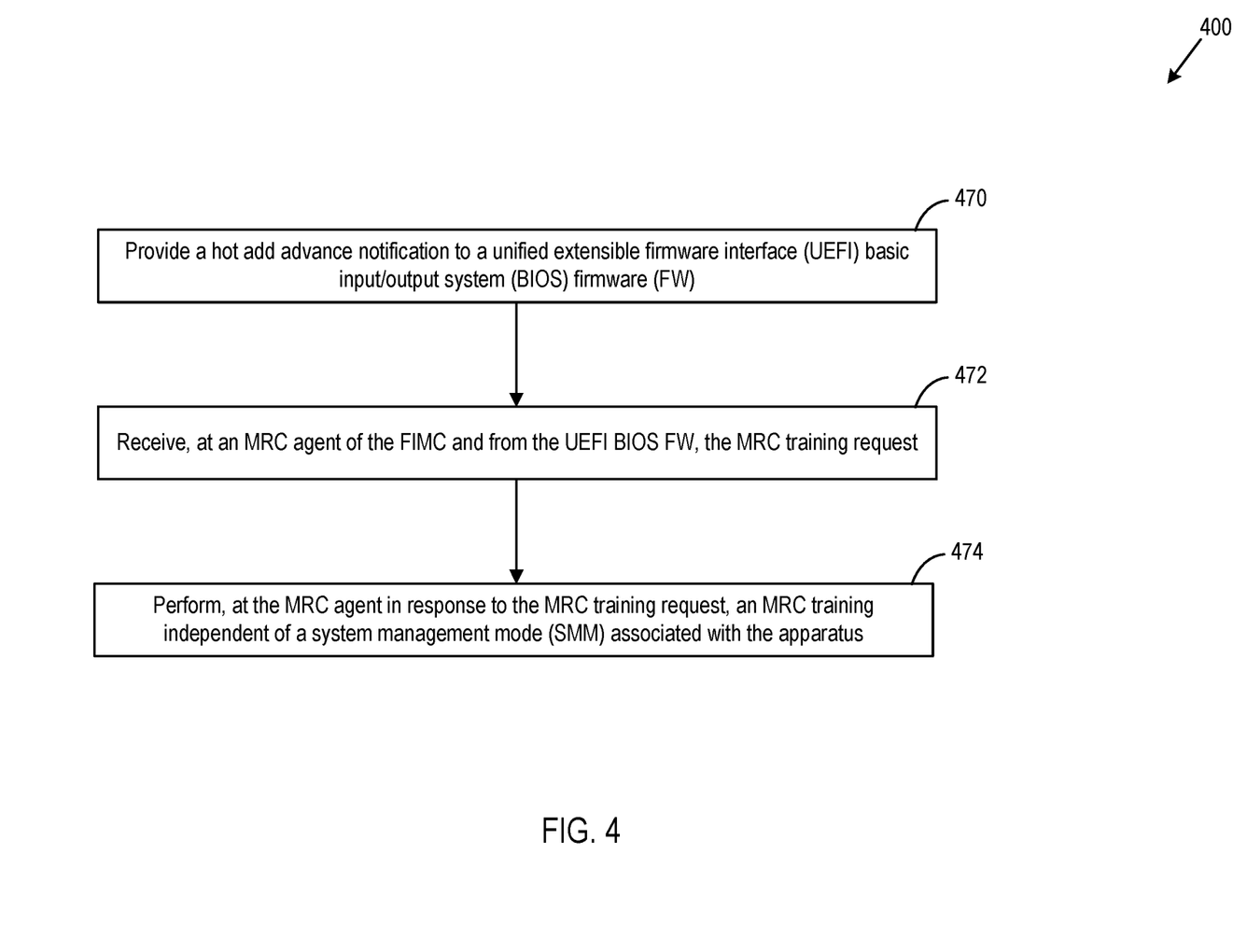
FIGS. 4, 5, and 6 are flow diagrams illustrating methods for MRC training according to various embodiments.

FIG. 4 illustrates a method 400 for MRC training according to various embodiments. The method 400 can include providing 470 a hot add notification to a UEFI BIOS FW. The method 400 can also include receiving 472 at an MRC agent of the FIMC and from the UEFI BIOS FW, the MRC training request and performing 474, at the MRC agent in response to the MRC training request, an MRC training independent of a system management mode (SMM) associated with the apparatus.

The method 400 can also include providing a hot add notification to an ACPI via a TEE. The method 400 can also include receiving the MRC training request from the TEE. The memory controller can be configured with internal memory that stores MRC code used to execute the MRC agent. The method 400 can further include modifying the MRC code stored in the internal memory to update the MRC agent in response to a performance of the MRC training. The method 400 can also include performing the MRC training using the internal memory.

Figure 5:
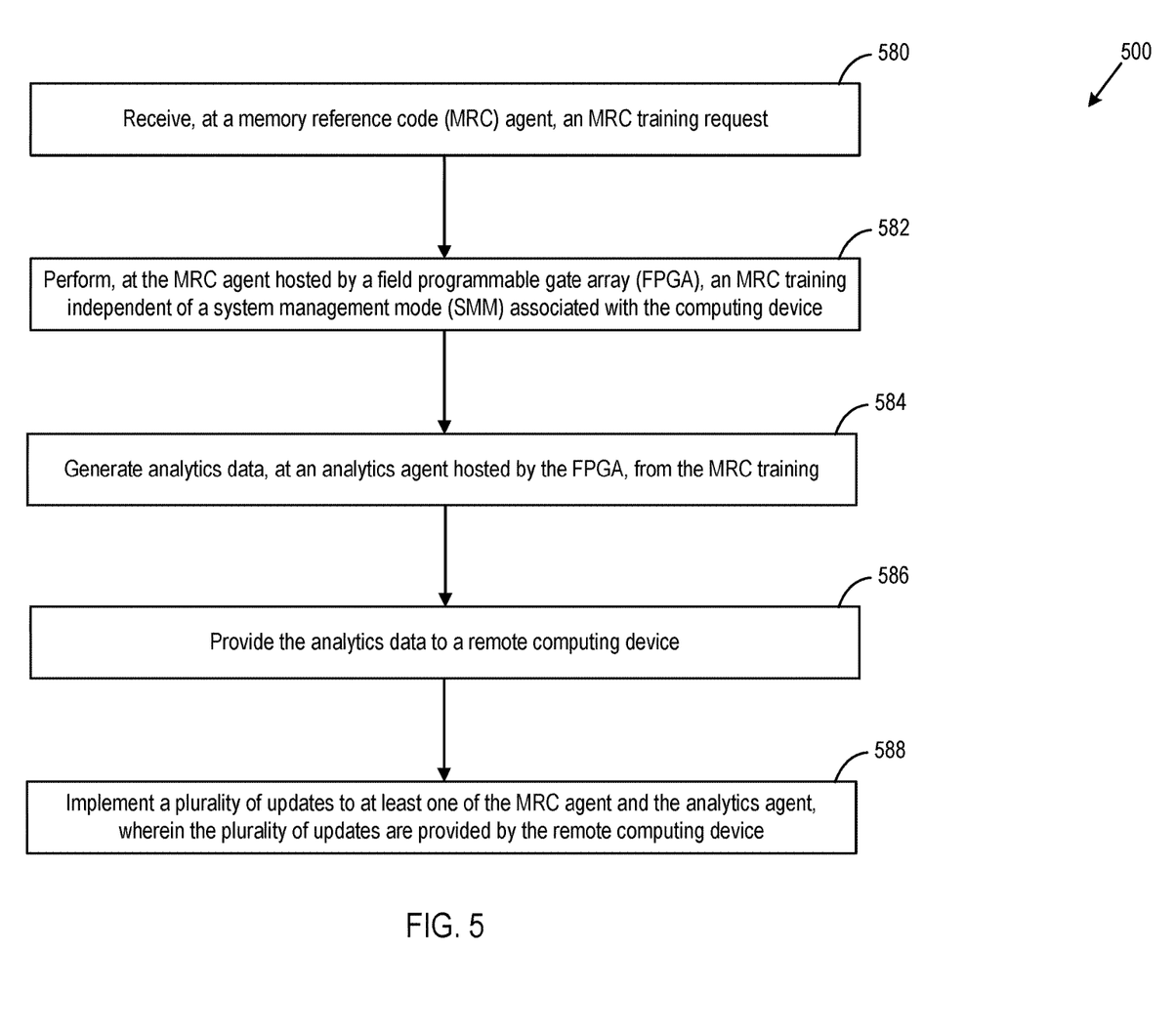

FIG. 5 illustrates a method 500 for MRC training according to various embodiments. The method 500 includes receiving 580, at an MRC agent an MRC training request; performing 582, at the MRC agent hosted by an FPGA, an MRC training independent of an SMM associated with the computing device; generating 584 analytics data, at an analytics agent hosted by the FPGA, from the MRC training; providing 586 the analytics data to a remote computing device; and implementing 588 a plurality of updates to at least one of the MRC agent and the analytics agent, wherein the plurality of updates are provided by the remote computing device.

The method 500 can further include providing the analytics data to a TEE. The method 500 can also include providing the analytics data to an admin computing device from the TEE using a secure OOB channel. The OOB channel can connect the TEE to the admin computing device via a network. The FPGA can reside in a memory controller.

The method 500 can also include generating the analytics data using memory internal to the memory controller. The FPGA can reside in at least one of a processing unit, a memory controller, an I/O controller, and/or a graphical processing unit (GPU) package. The FPGA has direct memory access. That is, the FPGA has direct access to system memory to perform MRC training. The FPGA can access memory that is on the FPGA and/or on the memory controller (e.g., memory controller package). The FPGA may address memory in one or more DIMMs that has been partitioned and isolated for exclusive use by the memory controller.

The direct memory access can be provided through bus access to system memory. The method 500 can further include implementing the plurality of updates independently of an OS. The method 500 can also include implementing the plurality of updates independently of a BIOS.

Figure 6:
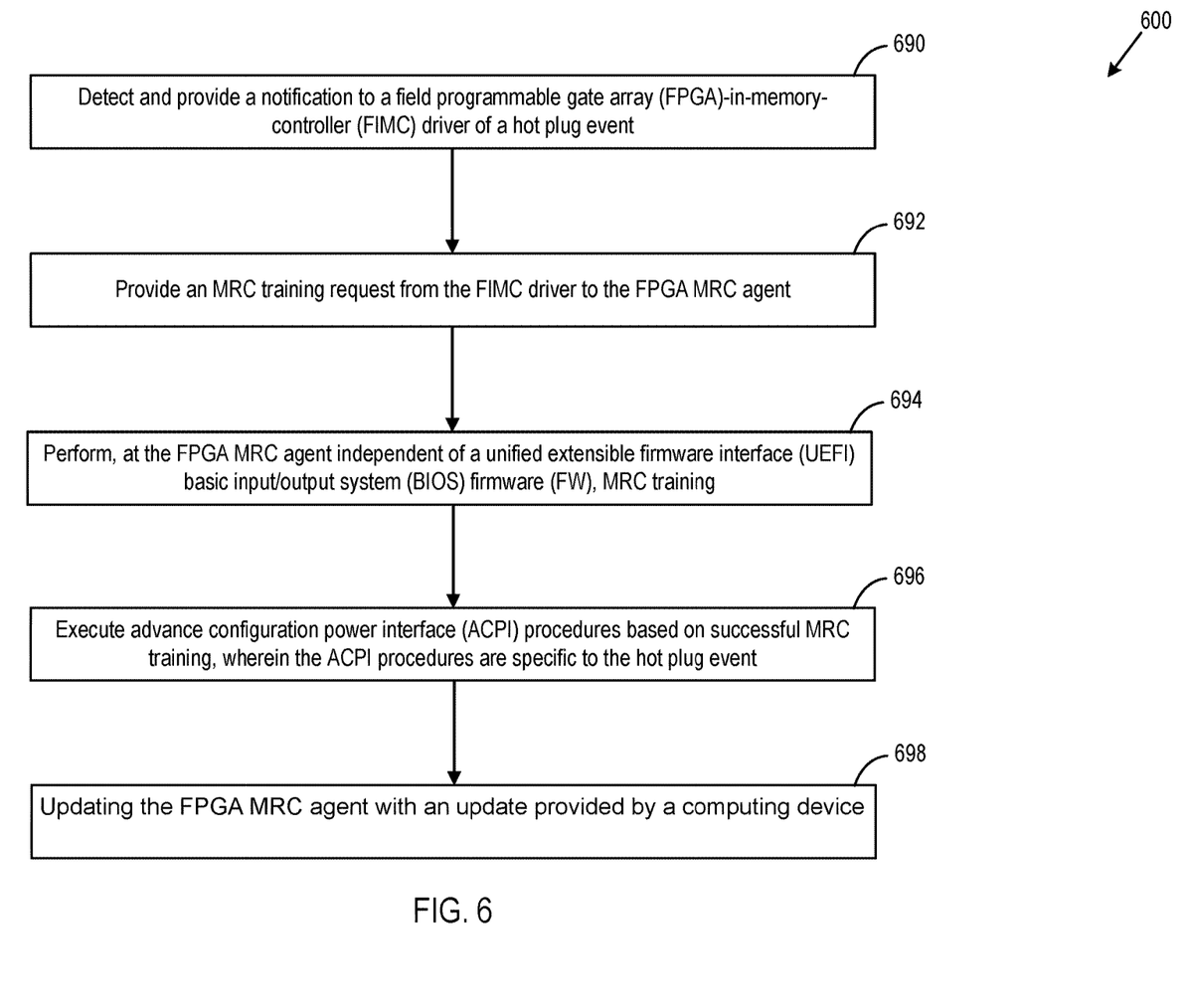

FIG. 6 illustrates a method 600 for MRC training according to various embodiments. The method 600 can also include detecting 690 and providing a notification to an FIMC driver of a hot plug event; providing 692 a MRC training request from the FIMC driver to the FPGA MRC agent; performing 694, at the FPGA MRC agent independent of a UEFI BIOS FW, MRC training, executing 696 ACPI procedures based on successful MRC training, wherein the ACPI procedures are specific to the hot plug event, and updating 698 the FPGA MRC agent with an update provided by a computing device.

The ACPI procedures include mechanisms to perform implementation-specific operations based on the hot plug event. The ACPI procedures can include updating a memory map.

The update can be generate by the computing device by performing machine learning on MRC analytics data from at least the MRC training. The method 600 can also include paying to crank-up memory access bandwidth for improved input/output I/O).

Figure 7:
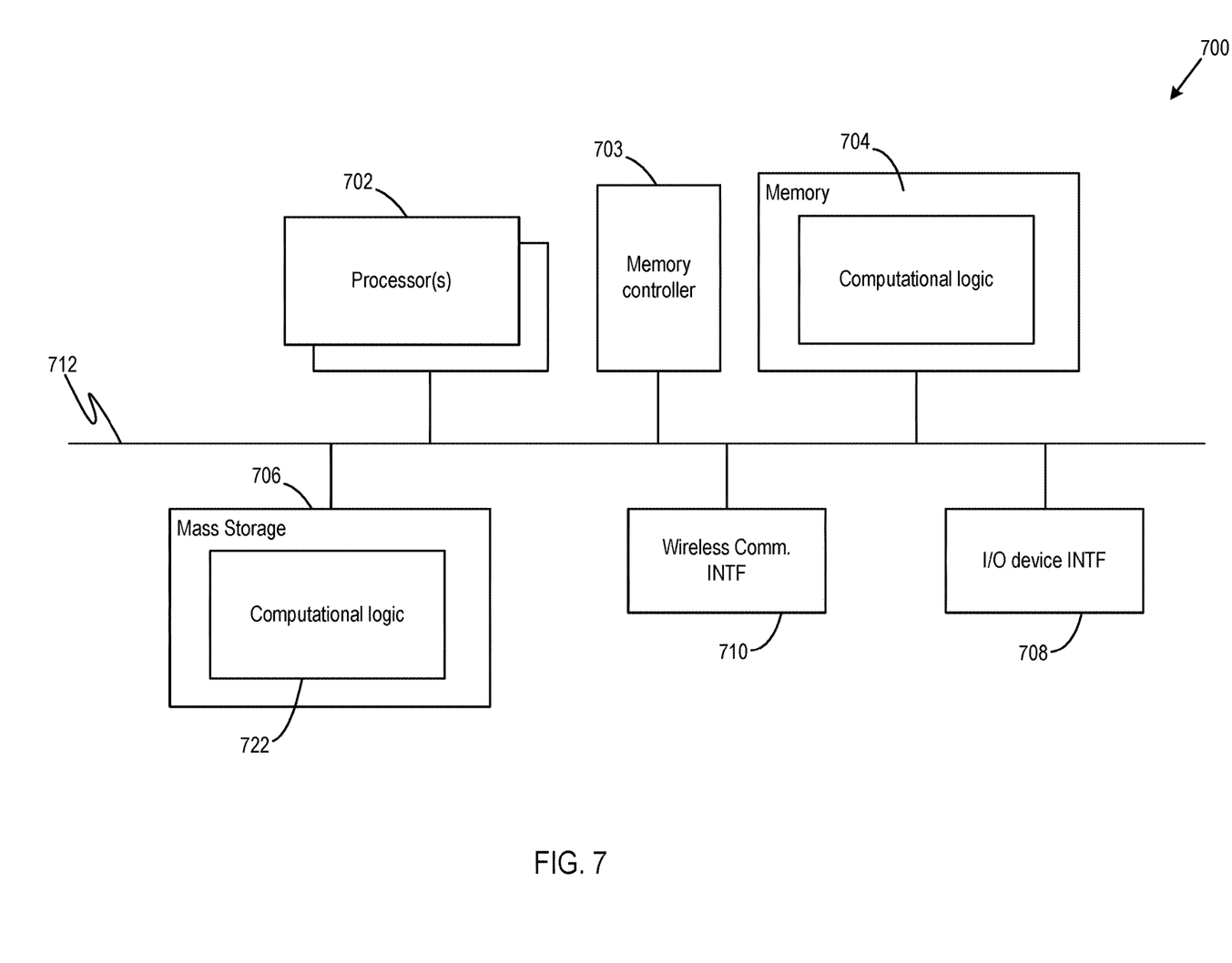
FIG. 7 is a block diagram illustrating an example computing device suitable for use to practice aspects of the present disclosure, according to various embodiments.

FIG. 7 illustrates an example of a computing device 700 suitable for use to practice aspects of the present disclosure, according to various embodiments. As shown, the computing device 700 may include one or more processors 702, each with one or more processor cores, system memory 704, and a memory controller 703. The system memory 704 may be any volatile or non-volatile memory. Additionally, the computing device 700 may include mass storage devices 706. Example of the mass storage devices 706 may include,
but are not limited to, tape drives, hard drives, compact disc read-only memory (CD-ROM), and so forth. Further, the computing device 700 may include input/output devices 708 (such as display, keyboard, cursor control, and so forth) and communication interfaces 710 (such as wireless and/or wired communication/network interface cards, modems, and so forth). The elements may be coupled to each other via a system bus 712, which may represent one or more buses. In the case of multiple buses, they may be bridged by one or more bus bridges (not shown).

Each of these elements may perform its conventional functions known in the art. The system memory 704 and the mass storage devices 706 may be employed to store a working copy and a permanent copy of the programming instructions implementing a number of operations referred to as computational logic 722. The memory controller 703 may include internal memory to store a working copy and a permanent copy of the programming instructions (e.g., MRC code) implementing a number of operation associated with MRC training. The computational logic 722 may be implemented by assembler instructions supported by the processor(s) 702 or high-level languages, such as, for example, C, that can be compiled into such instructions.

The number, capability, and/or capacity of these elements 710 and 712 may vary, depending on whether the computing device 700 is used as a mobile device, such as a wearable device, a smartphone, a computer tablet, a laptop, and so forth, or a stationary device, such as a desktop computer, a server, a game console, a set-top box, an infotainment console, and so forth. Otherwise, the constitutions of elements 710 and 712 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system." Furthermore, the present disclosure may take the form of a computer program product embodied in any tangible or non-transitory medium of expression having computer-usable program code embodied in the medium.

Figure 8:
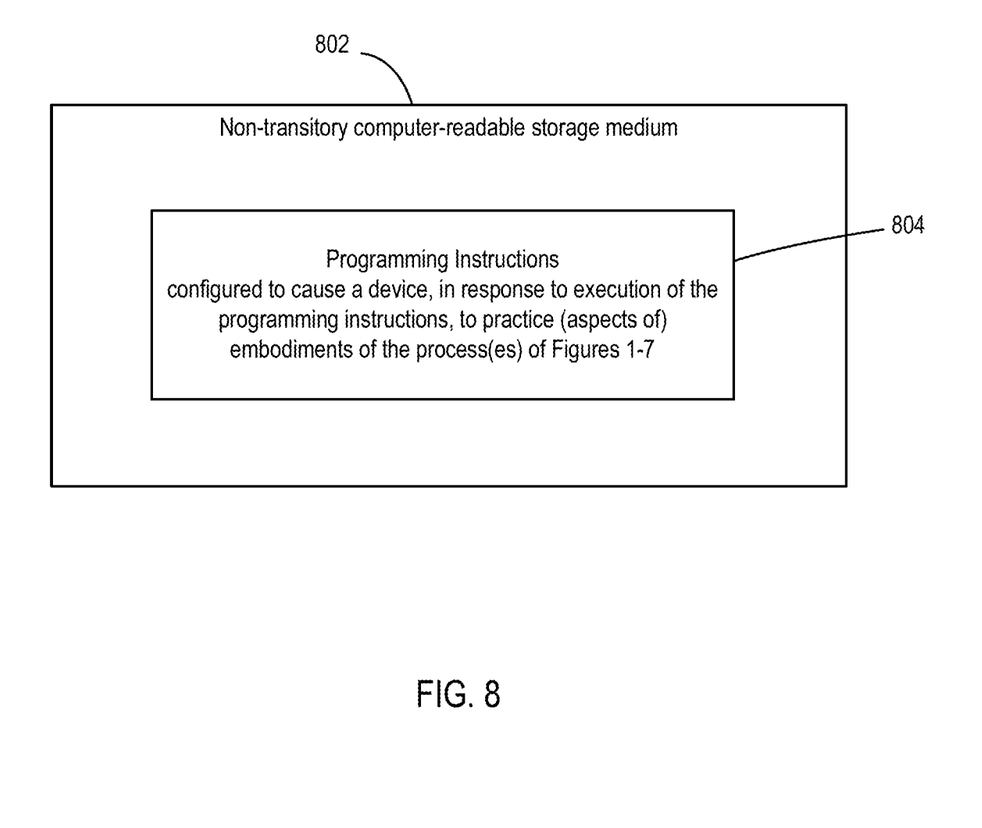
FIG. 8 is a block diagram illustrating a storage medium having instructions for practicing methods described with references to FIGS. 1-7, according to various embodiments.

FIG. 8 illustrates an example non-transitory computer-readable storage medium that may be suitable for use to store instructions that cause an apparatus, in response to execution of the instructions by the apparatus, to practice selected aspects of the present disclosure. As shown, a non-transitory computer-readable storage medium 802 may include a number of programming instructions 804. The programming instructions 804 may be configured to enable a device (e.g., the computing device 700 in FIG. 7) in response to execution of the programming instructions, to implement (aspects of) the MRC agent 114 and/or the analytics agent 116 in FIG. 1, as earlier described. In alternative embodiments, the programming instructions 804 may be disposed on the multiple non-transitory computer-readable storage media 802 instead. In still other embodiments, the programming instructions 804 may be disposed on the transitory computer-readable storage media, such as, signals.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer; partly on the user's computer, as a stand-alone software package; partly on the user's computer and partly on a remote computer; or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include plural forms as well, unless the context clearly indicates otherwise. It will be further understood that the terms "comprises" and/or "comprising," when used in this specification, are specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system, or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material, or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 7, for one embodiment, at least one of the processors 702 may be packaged together with memory, as earlier described. For one embodiment, at least one of the processors 702 may be packaged together with memory, to form a System in Package (SiP). For one embodiment, at least one of the processors 702 may be integrated on the same die with memory. For one embodiment, at least one of the processors 702 may be packaged together with memory, to form an SoC. For at least one embodiment, the SoC may be utilized in, (e.g., but not limited to, a wearable device, a smartphone or a computing tablet.) Thus various example embodiments of the present disclosure have been described including, but are not limited to:

Example 1 is an apparatus for performing memory reference code (MRC) training. The apparatus includes one or more electronic memory to store an MRC training request. The apparatus includes a memory controller designed to host a field programmable gate array (FPGA)-in-memory-controller (FIMC) and to provide a hot add notification to a unified extensible firmware interface (UEFI) basic input/output system (BIOS) firmware (FW), and receive, at an MRC agent of the FIMC and from the UEFI BIOS FW, the MRC training request. The apparatus includes a memory controller designed to host a field programmable gate array (FPGA)-in-memory-controller (FIMC) and to perform, at the MRC agent in response to the MRC training request, an MRC training independent of a system management mode (SMM) associated with the apparatus.

Example 2 is the apparatus of Example 1, where the memory controller designed to provide the hot add notification is further designed to provide a hot add notification to an advance configuration power interface (ACPI) via a trusted execution environment (TEE).

Example 3 is the apparatus of Example 2, where the memory controller designed to receive the MRC training request is further designed to receive the MRC training request from the TEE.

Example 4 is the apparatus of Example 1, where the memory controller includes internal memory that stores MRC code used to execute the MRC agent.

Example 5 is the apparatus of Example 4, where the memory controller is further designed to modify the MRC code stored in the internal memory to update the MRC agent in response to a performance of the MRC training.

Example 6 is the apparatus of Example 4, where the memory controller designed to perform the MRC training is further designed to perform the MRC training using the internal memory.

Example 7 is a computer-readable storage medium. The computer-readable storage medium having stored thereon instructions that, when implemented by a computing device, cause the computing device to receive, at a memory reference code (MRC) agent an MRC training request and perform, at the MRC agent hosted by a field programmable gate array (FPGA), an MRC training independent of a system management mode (SMM) associated with the computing device. The computer-readable storage medium having stored thereon instructions that, when implemented by a computing device, cause the computing device to generate analytics data, at an analytics agent hosted by the FPGA, from the MRC training, provide the analytics data to a remote computing device, and implement a variety of updates to at least one of the MRC agent and the analytics agent, where the variety of updates are provided by the remote computing device.

Example 8 is the computer-readable storage medium of Example 7, where the instructions to provide the analytics data further include instructions to provide the analytics data to a trusted execution environment (TEE).

Example 9 is the computer-readable storage medium of Example 8, where the instructions to provide the analytics data further includes instructions to provide the analytics data to an admin computing device from the TEE using a secure out of band (OOB) channel.

Example 10 is the computer-readable storage medium of Example 9, where the OOB channel connects the TEE to the admin computing device via a network.

Example 11 is the computer-readable storage medium of Example 7, where the FPGA resides in a memory controller.

Example 12 is the computer-readable storage medium of Example 7, where the instructions to generate the analytics data further include instructions to generate the analytics data using memory internal to the memory controller.

Example 13 is the computer-readable storage medium of Example 7, where the FPGA resides in at least one of a processing unit and a memory controller.

Example 14 is the computer-readable storage medium of Example 7, where the FPGA has direct memory access.

Example 15 is the computer-readable storage medium of Example 7, where the direct memory access is provided through bus access to system memory.

Example 16 is the computer-readable storage medium of Example 7, where the instructions to implement the variety of updates further includes instructions to implement the variety of updates independently of an operating system (OS).

Example 17 is the computer-readable storage medium of Example 7, where the instructions to implement the variety of updates further includes instructions to implement the variety of updates independently of a basic input/output system (BIOS).

Example 18 is a method for performing memory reference code (MRC) training. The method includes detecting and providing a notification to a field programmable gate array (FPGA)-in-memory-controller (FIMC) driver of a hot plug event, providing an MRC training request from the FIMC driver to the FPGA MRC agent, and performing, at the FPGA MRC agent independent of a unified extensible firmware interface (UEFI) basic input/output system (BIOS) firmware (FW), MRC training. The method also includes executing advance configuration power interface (ACPI) procedures based on successful MRC training, where the ACPI procedures are specific to the hot plug event, and updating the FPGA MRC agent with an update provided by a computing device.

Example 19 is the method of Example 18, where the ACPI procedures include mechanisms to perform implementation-specific operations based on the hot plug event.

Example 20 is the method of Example 19, where the ACPI procedures include updating a memory map.

Example 21 is the method of Example 18, where the update is generate by the computing device by performing machine learning on MRC analytics data from at least the MRC training.

Example 22 is the method of Example 18, further including paying to crank-up memory access bandwidth for improved input/output (I/O).

Example 23 is a method for performing memory reference code (MRC) training. The method includes storing an MRC training request and providing a hot add notification to a unified extensible firmware interface (UEFI) basic input/output system (BIOS) firmware (FW). The method includes receiving, at an MRC agent of the FIMC and from the UEFI BIOS FW, the MRC training request and performing, at the MRC agent in response to the MRC training request, an MRC training independent of a system management mode (SMM) associated with the apparatus.

Example 24 is the method of Example 23, where providing the hot add notification further includes providing a hot add notification to an advance configuration power interface (ACPI) via a trusted execution environment (TEE).

Example 25 is the method of Example 24, where receiving the MRC training request further includes receiving the MRC training request from the TEE.

Example 26 is the method of Example 23, further including storing MRC code used to execute the MRC agent.

Example 27 is the method of Example 26, further including modifing the MRC code stored in the internal memory to update the MRC agent in response to a performance of the MRC training.

Example 28 is the method of Example 26, where performing the MRC training further includes performing the MRC training using the internal memory.

Example 29 is a method. The method includes receiving, at a memory reference code (MRC) agent an MRC training request and performing, at the MRC agent hosted by a field programmable gate array (FPGA), an MRC training independent of a system management mode (SMM) associated with the computing device. The method also includes generating analytics data, at an analytics agent hosted by the FPGA, from the MRC training, providing the analytics data to a remote computing device, and implementing a variety of updates to at least one of the MRC agent and the analytics agent, where the variety of updates are provided by the remote computing device.

Example 30 is the method of Example 29, where providing the analytics data further include providing the analytics data to a trusted execution environment (TEE).

Example 31 is the method of Example 30, where providing the analytics data further includes providing the analytics data to an admin computing device from the TEE using a secure out of band (OOB) channel.

Example 32 is the method of Example 31, where the OOB channel connects the TEE to the admin computing device via a network.

Example 33 is the method of Example 29, where the FPGA resides in a memory controller.

Example 34 is the method of Example 29, where generating the analytics data further include generating the analytics data using memory internal to the memory controller.

Example 35 is the method of Example 29, where the FPGA resides in at least one of a processing unit and a memory controller.

Example 36 is the method of Example 29, where the FPGA has direct memory access.

Example 37 is the method of Example 29, where the direct memory access is provided through bus access to system memory.

Example 38 is the method of Example 29, where implementing the variety of updates further includes implementing the variety of updates independently of an operating system (OS).

Example 39 is the method of Example 29, where implementing the variety of updates further includes implementing the variety of updates independently of a basic input/output system (BIOS).

Example 40 is at least one computer-readable storage medium having stored thereon computer-readable instructions, when executed, to implement a method as exemplified in any of Examples 18-39.

Example 41 is an apparatus including procedures to perform a method as exemplified in any of Examples 18-19.

Example 42 is a procedures for performing a method as exemplified in any of Examples 18-19.

It will be obvious to those having skill in the art that many changes may be made to the details of the above-described embodiments without departing from the underlying principles of the embodiments described herein. The scope of the present embodiments should, therefore, be determined only by the following claims.

The invention claimed is:

1. An apparatus for performing memory reference code (MRC) training, comprising:
   one or more electronic memory to store an MRC training request;
   a field programmable gate array (FPGA)-in-memory-controller (FIMC) comprising an MRC agent; and
   a memory controller configured to host the FIMC and to provide a hot add notification to a unified extensible firmware interface (UEFI) basic input/output system (BIOS) firmware (FW);
   wherein the FIMC is configured to:
      receive, at the MRC agent of the FIMC and from the UEFI BIOS FW, the MRC training request; and
      perform, at the MRC agent in response to the MRC training request, an MRC training independent of a system management mode (SMM) associated with the apparatus.

2. The apparatus of claim 1, wherein the memory controller configured to provide the hot add notification is further configured to provide the hot add notification to an advance configuration power interface (ACPI) via a trusted execution environment (TEE).

3. The apparatus of claim 2, wherein the memory controller is further configured to receive the MRC training request from the TEE.

4. The apparatus of claim 1, wherein the memory controller comprises internal memory that stores MRC code used to execute the MRC agent.

5. The apparatus of claim 4, wherein the memory controller is further configured to modify the MRC code stored in the internal memory to update the MRC agent in response to a performance of the MRC training.

6. The apparatus of claim 4, wherein the MRC agent of the FMIC is further configured to perform the MRC training using the internal memory.

7. A non-transitory computer-readable storage medium having stored thereon instructions that, when implemented by a computing device, cause the computing device to:
   receive, at a memory reference code (MRC) agent implemented in a field programmable gate array (FPGA), an MRC training request;
   perform, at the MRC agent implemented in the FPGA, an MRC training independent of a system management mode (SMM) associated with the computing device;
   generate analytics data, at an analytics agent hosted by the FPGA, from the MRC training;
   provide the analytics data to a remote computing device; and
   implement a plurality of updates to at least one of the MRC agent and the analytics agent, wherein the plurality of updates are provided by the remote computing device.

8. The non-transitory computer-readable storage medium of claim 7, wherein the instructions to provide the analytics data further comprise instructions to provide the analytics data to a trusted execution environment (TEE).

9. The non-transitory computer-readable storage medium of claim 8, wherein the instructions to provide the analytics data further comprises instructions to provide the analytics data to an admin computing device from the TEE using a secure out of band (OOB) channel.

10. The non-transitory computer-readable storage medium of claim 9, wherein the OOB channel connects the TEE to the admin computing device via a network.

11. The non-transitory computer-readable storage medium of claim 7, wherein the FPGA resides in a memory controller.

12. The non-transitory computer-readable storage medium of claim 7, wherein the instructions to generate the analytics data further comprise instructions to generate the analytics data using memory internal to a memory controller.

13. The non-transitory computer-readable storage medium of claim 7, wherein the FPGA resides in at least one of a processing unit and a memory controller.

14. The non-transitory computer-readable storage medium of claim 7, wherein the FPGA has direct memory access.

15. The non-transitory computer-readable storage medium of claim 14, wherein the direct memory access is provided through bus access to system memory.

16. The non-transitory computer-readable storage medium of claim 7, wherein the instructions to implement the plurality of updates further comprises instructions to implement the plurality of updates independently of an operating system (OS).

17. The non-transitory computer-readable storage medium of claim 7, wherein the instructions to implement the plurality of updates further comprises instructions to implement the plurality of updates independently of a basic input/output system (BIOS).

18. A method for performing memory reference code (MRC) training, comprising:
 detecting and providing a notification to a field programmable gate array (FPGA)-in-memory-controller (FIMC) driver of a hot plug event;
 providing an MRC training request from the FIMC driver to an FPGA comprising an MRC agent;
 performing, at the FPGA comprising the MRC agent independent of a unified extensible firmware interface (UEFI) basic input/output system (BIOS) firmware (FW), MRC training;
 executing advance configuration power interface (ACPI) procedures based on successful MRC training, wherein the ACPI procedures are specific to the hot plug event; and
 updating the FPGA comprising the MRC agent with an update provided by a computing device.

19. The method of claim 18, wherein the ACPI procedures include mechanisms to perform implementation-specific operations based on the hot plug event.

20. The method of claim 19, wherein the ACPI procedures include updating a memory map.

21. The method of claim 18, wherein the update is generated by the computing device by performing machine learning on MRC analytics data from at least the MRC training.

22. The method of claim 18, further comprising paying to crank-up memory access bandwidth for improved input/output (I/O).

* * * * *